(12) United States Patent
Stroud

(10) Patent No.: US 9,084,415 B2
(45) Date of Patent: Jul. 21, 2015

(54) ELASMOBRANCH-REPELLING MAGNETS AND METHODS OF USE

(71) Applicant: Eric Matthew Stroud, Oak Ridge, NJ (US)

(72) Inventor: Eric Matthew Stroud, Oak Ridge, NJ (US)

(*) Notice: Subject to any disclaimer, the term of this patent is extended or adjusted under 35 U.S.C. 154(b) by 0 days.

(21) Appl. No.: 14/104,207

(22) Filed: Dec. 12, 2013

(65) Prior Publication Data

US 2014/0173966 A1     Jun. 26, 2014

Related U.S. Application Data

(63) Continuation of application No. 11/886,109, filed as application No. PCT/US2006/008587 on Mar. 10, 2006, now abandoned.

(60) Provisional application No. 60/660,193, filed on Mar. 10, 2005, provisional application No. 60/699,591, filed on Jul. 15, 2005.

(51) Int. Cl.
| | |
|---|---|
| *A01K 99/00* | (2006.01) |
| *A01M 29/24* | (2011.01) |
| *E02B 1/00* | (2006.01) |
| *A01K 75/00* | (2006.01) |
| *A01K 79/02* | (2006.01) |
| *A01K 83/00* | (2006.01) |
| *A01K 91/18* | (2006.01) |
| *A01K 95/00* | (2006.01) |

(52) U.S. Cl.
CPC ................ *A01M 29/24* (2013.01); *A01K 75/00* (2013.01); *A01K 79/02* (2013.01); *A01K 83/00* (2013.01); *A01K 91/18* (2013.01); *A01K 95/00* (2013.01); *E02B 1/006* (2013.01)

(58) Field of Classification Search
CPC ...... A01M 29/24; A01M 29/00; A01K 61/00; A01K 79/00; A01K 79/02
USPC ....................................... 43/4.5; 119/220, 219
See application file for complete search history.

(56) References Cited

U.S. PATENT DOCUMENTS

| | | | | |
|---|---|---|---|---|
| 2,637,887 | A | * | 5/1953 | Goodman et al. .............. 24/303 |
| 2,879,618 | A | | 3/1959 | Kirkland, Jr. |
| 3,683,280 | A | | 8/1972 | Holt |
| 3,822,403 | A | | 7/1974 | Coleman et al. |
| 4,582,582 | A | * | 4/1986 | Gibbard ........................ 204/193 |
| 4,667,431 | A | | 5/1987 | Mendicino |

(Continued)

FOREIGN PATENT DOCUMENTS

| | | | |
|---|---|---|---|
| EP | 0726303 | A2 | 8/1996 |
| JP | 03065132 | A  * | 3/1991 ............ A01M 29/00 |

(Continued)

OTHER PUBLICATIONS https://web.archive.org/web/20040227051854/http://www.kjmagnetics.com/RX054.html.*

(Continued)

*Primary Examiner* — David Parsley
*Assistant Examiner* — Danielle Clerkley
(74) *Attorney, Agent, or Firm* — Hoxie & Associates, LLC

(57) ABSTRACT

Devices and methods are disclosed for repelling elasmobranchs with high-pull-force magnets, including devices and methods for reducing by-catch in commercial fisheries and protecting humans from attacks by elasmobranchs.

18 Claims, 8 Drawing Sheets

(56) References Cited

U.S. PATENT DOCUMENTS

| | | | |
|---|---|---|---|
| 4,792,367 A | 12/1988 | Lee | |
| 4,895,607 A | 1/1990 | Yang et al. | |
| 4,917,778 A | 4/1990 | Takada et al. | |
| 4,922,468 A * | 5/1990 | Menezes | 367/139 |
| 4,937,966 A | 7/1990 | McKenzie | |
| 5,129,963 A | 7/1992 | Panchanathan et al. | |
| 5,636,467 A | 6/1997 | Adams | |
| 5,719,543 A | 2/1998 | Berling | |
| 5,924,236 A | 7/1999 | Preston | |
| 5,941,010 A | 8/1999 | Latwesen | |
| 6,176,033 B1 | 1/2001 | Latwesen | |
| 6,301,822 B1 | 10/2001 | Zernov | |
| 6,506,265 B2 | 1/2003 | Yamamoto et al. | |
| 6,551,234 B1 | 4/2003 | Martello | |
| 6,606,963 B1 | 8/2003 | Wynne | |
| 6,671,997 B2 | 1/2004 | Lindgren | |
| 7,037,153 B1 | 5/2006 | Wynne | |
| 7,270,083 B2 | 9/2007 | Wescombe-Down | |
| 7,507,132 B2 | 3/2009 | Grune et al. | |
| 2004/0263303 A1 | 12/2004 | Kuriyama et al. | |
| 2005/0039692 A1 | 2/2005 | Wescombe-Down | |
| 2007/0256623 A1 | 11/2007 | Stroud | |
| 2009/0038205 A1 | 2/2009 | Stroud | |
| 2010/0016346 A1 | 1/2010 | Stroud | |
| 2010/0203154 A1 | 8/2010 | Stroud et al. | |
| 2014/0360084 A1 | 12/2014 | Stroud | |

FOREIGN PATENT DOCUMENTS

| | | | | |
|---|---|---|---|---|
| JP | 2000060358 A | * | 2/2000 | A01K 79/00 |
| WO | WO/03/011025 | | 2/2003 | |

OTHER PUBLICATIONS https://web.archive.org/web/20061031044859/http://www.kjmagnetics.com/proddetail.asp?prod=BY0Y08.*

CRC Handbook of Chemistry and Physics: a ready-reference book of chemical and physical data, 89th edition, 2008-2009, Section 9, p. 77.

Activity Series of the Metals, published on the Web, 2002; accessed Nov. 9, 2009.

http://www.kjmagnetics/proddetail.asp?prod=RX054 downloaded Oct. 31, 2012.

http://www.kjmagnetics/proddetail.asp?prod=BY0Y08 downloaded Oct. 31, 2012.

U.S. Appl. No. 14/304,654—Notice of Allowance dated Sep. 25, 2014.

* cited by examiner

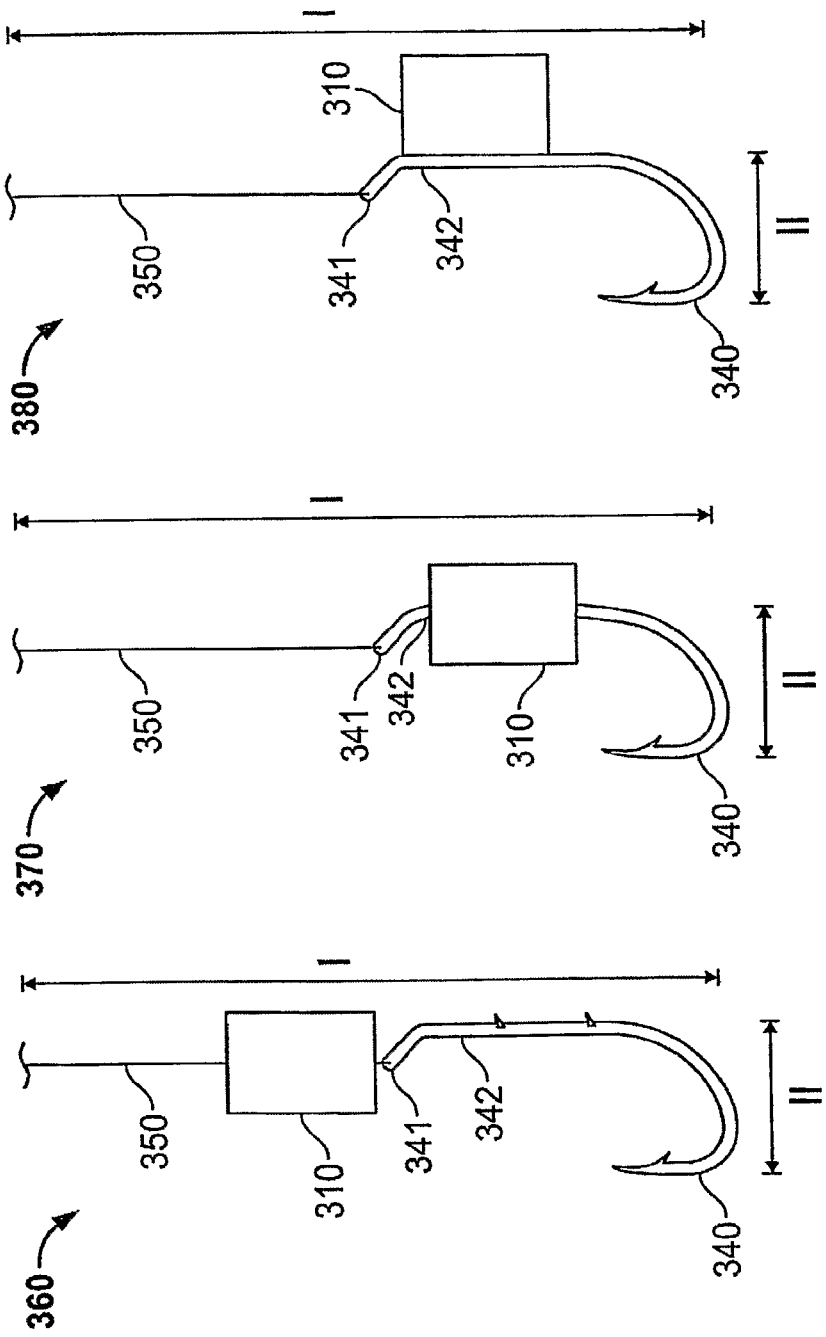

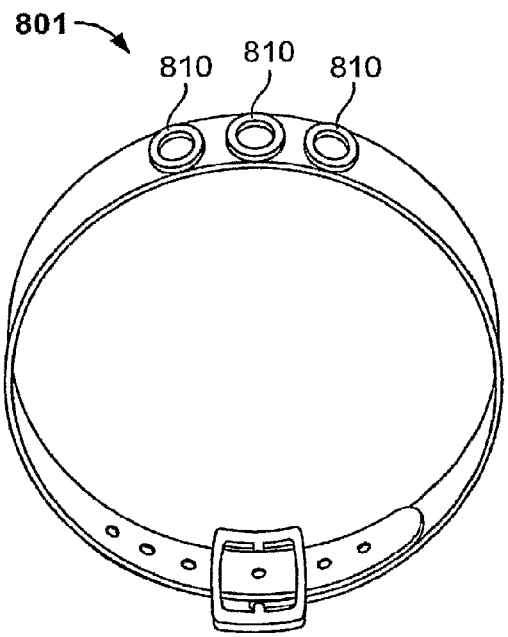
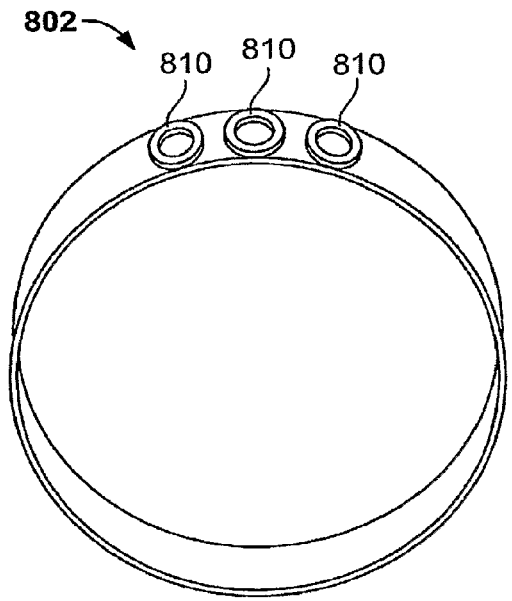
FIG. 8A  FIG. 8B
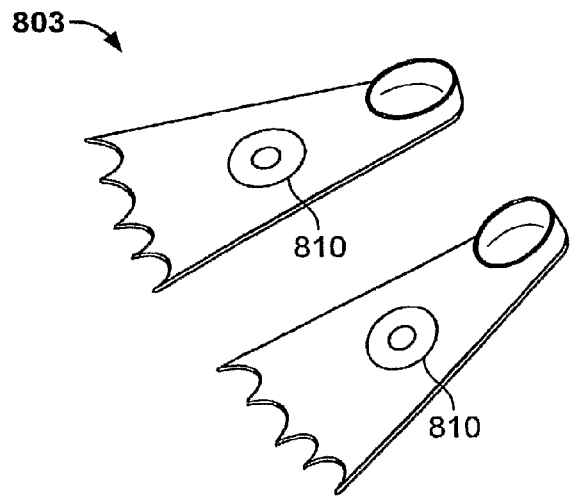
FIG. 8C

ELASMOBRANCH-REPELLING MAGNETS AND METHODS OF USE

INTRODUCTION

This invention relates generally to high-pull-force magnets for repelling elasmobranchs and methods of using high-pull-force magnets to repel elasmobranchs.

BACKGROUND OF THE INVENTION

Elasmobranchs represent a significant problem in the commercial fishing industry. Elasmobranchs are often inadvertently caught on fishing hooks and tackle directed at other more commercially valuable kinds of fish. This inadvertent catching of elasmobranchs (or other non-valued fish) is called "by-catch." As many as 100 million elasmobranchs are killed each year as by-catch. This loss of life has resulted in a real threat to several shark species. Currently, as many as 80 species of shark are considered threatened with extinction.

Further, when elasmobranchs are caught as by-catch, fishing operations receive no return on their investment since the shark is caught on a hook that might have otherwise brought in a marketable fish. Additionally, the fishing tackle on which a shark is caught often must be cut loose for the safety of those working on the fishing vessel causing a loss of both equipment and time.

Longlining is a commercial fishing method that suffers significant losses from shark by-catch. Longlining uses multiple baited individual fish hooks with leaders strung at intervals along an often very long (2-3 miles) main fishing line. Longline fishing operations routinely target swordfish and tuna. The longline hooks, however, are not selective and elasmobranchs are sometimes caught in greater numbers than the intended catch. The result is great loss of life in elasmobranchs and significant financial losses in the longline industry. Elasmobranchs cause additional losses in the longline fishing industry by scavenging marketable fish caught on longlines before the fish may be retrieved for processing.

Elasmobranchs also represent a problem in the commercial trawling industry. Trawling is a commercial fishing method that catches fish in nets. Elasmobranchs cause significant losses for trawlers because they scavenge fish caught in trawl nets before they are retrieved for processing. As such, valuable fish are often lost to shark predation. Also, sharks often tear holes in the nets, resulting in partial or complete loss of catch and significant repair costs.

There has been a long-felt need for methods and devices to deter elasmobranchs from commercial fishing lines and nets. Attempts in the middle of the twentieth century were made to protect trawl nets with electric discharge devices. (Nelson, "Shark Attack and Repellency Research: An Overview," Shark Repellents from the Sea ed. Bernhard Zahuranec (1983) at p. 20). Nevertheless, no commercially effective repellent has yet to be made available for reducing shark by-catch in the commercial fishing industry or for reducing loss of valuable fish or fishing tackle to shark predation. Further, Applicant is unaware of any consideration in the art of the use of magnets to repel elasmobranchs to limit by-catch and other losses from elasmobranchs.

U.S. Pat. No. 4,667,431 discloses an electric prod for repelling fish. Within the electric prod, the switch for providing electric current to the prod is a reed switch, which contains a magnet. However, the magnet is not a part of the repelling portion of the electric prod.

An effective shark repellent would not only be valuable to the fishing industry but also would be valuable for protecting humans from shark attacks. No effective repellent has yet to be marketed for limiting the risk of shark attacks faced by humans exposed to elasmobranchs. Over the last 50 years antishark measures employed to protect humans from shark have included electrical repellent devices (Gilbert & Springer 1963, Gilbert & Gilbert 1973), acoustical playbacks (Myrberg et al. 1978, Klimley & Myrberg 1979), visual devices (Doak 1974) and chemical repellents (Tuve 1963, Clark 1974, Gruber & Zlotkin 1982). None of these procedures proved satisfactory in preventing shark attacks. (Sisneros (2001)). As such, the long felt need for an effective repellent has not been satisfied.

Researchers have historically used several bio-assays to determine if a repellent evokes a flight response in shark. One such bio-assay measures the effect of a repellent on a shark that is immobilized in "tonic immobility." Tonic immobility is a state of paralysis that typically occurs when a shark is subject to inversion of its body along the longitudinal axis. This state is called "tonic," and the shark can remain in this state for up to 15 minutes thereby allowing researchers to observe effects of repellents. After behavioral controls are established, an object or substance that has a repelling effect will awaken a shark from a tonic state. Researches can quantify the strength of a repellent effect from these studies.

Another bio-assay employs a Y-shaped maze wherein a shark is exposed to a choice between two paths containing the same olfactory stimulus. One path exits the maze without a repellent while the other contains a repellent. If the sharks consistently choose the path without the repellent or consistently become agitated in the path having the repellent, researchers may conclude the repellent is effective.

BRIEF SUMMARY OF THE INVENTION

Applicant has discovered that a high-pull-force magnet is an effective elasmobranch repellent useful in limiting by-catch as well as protecting humans. High-pull-force magnets, known or hereinafter developed, that are of sufficient strength to repel elasmobranchs are acceptable in aspects of the present invention.

According to a non-limiting embodiment of the present invention, an apparatus for repelling elasmobranchs is provided comprising a high-pull-force magnet. Preferably, the high-pull-force magnet is a permanent magnet. More preferably, the high-pull-force magnet is a neodymium-iron-boride magnet. According to a non-limiting embodiment of the invention, the high-pull-force magnet may have a nickel coating to protect the magnet from corrosion. High-pull-force magnets in accordance with the present invention may have a shape of a cylinder, a cone, a circle, a cube, a disk, a bar, a sphere, a plate, a rod, a ring, a tube, a stick, a block or other shape. In a non-limiting embodiment of the invention, a high-pull-force magnet may have a hollow portion. In a non-limiting embodiment of the invention, a plurality of high-pull-force magnets may be arranged together in a ring. In another non-limiting embodiment of the invention, an apparatus is provided with a high-pull-force magnet that is capable of spinning.

High-pull-force magnets of the present invention have a pull force preferably of greater than about 50 pounds, more preferably greater than about 100 pounds, and most preferably greater than about 200 pounds. In a non-limiting embodiment, a high-pull-force magnet has a nominal strength of preferably greater than about 5000 gauss, more preferably greater than about 10,000 gauss, and most preferably greater than about 20,000 gauss. In a non-limiting embodiment, a high-pull-force magnet produces a magnetic strength preferably of about 5 gauss at a distance of about 0.01 m to about 1 m, more preferably of about 5 gauss to about 14,000 gauss at a distance of about 0.01 to about 0.5 m, and most preferably of about 10 gauss to about 320 gauss or greater at a distance of about 0.1 m to about 0.4 m.

According to a first non-limiting aspect of the present invention, an apparatus is provided comprising a high-pull-force magnet and a buoy, a barge, a net, fishing tackle or any combination thereof. Fishing tackle may comprise a longline, a main line, a gangion, a lead, a weight, a buoy, a net, or any combination thereof.

According to a second non-limiting aspect of the present invention, an apparatus is provided comprising a high-pull-force magnet and a fish hook. Such fish hook may be individual or attached to longline or mainline and such fish hook may have a single hook or multiple hooks.

According to a third non-limiting aspect of the present invention, a method is provided for repelling elasmobranchs comprising attaching a high-pull-force magnet to a hook, longline, mainline, fishing tackle, gangion, lead, weight, buoy, net, boat or any combination thereof.

According to a fourth non-limiting aspect of the present invention, an apparatus is provided comprising a surfboard and a high-pull-force magnet. A high-pull-force magnet may be housed within the surfboard, be attached to the surfboard, or be trailed behind the surfboard in the water.

In fifth non-limiting aspect of the present invention, a method is provided for repelling elasmobranchs comprising attaching a high-pull-force magnet to a human body or to clothing or accessories associated with a human body. In a preferred technique, a high-pull-force magnet may be attached to a human ankle or wrist or may be attached to a bracelet. A high-pull-force magnet may also be attached to a belt, a weight belt for diving, or flippers for diving and snorkeling.

In a sixth non-limiting aspect of the present invention, a kit is provided comprising a high-pull-force magnet.

BRIEF DESCRIPTION OF THE DRAWINGS

The invention will now be described by way of example with reference to the accompanying drawings wherein:

FIG. 2A illustrates a high-pull-force magnet attached to the line above the hook. FIG. 2B illustrates a high-pull-force magnet attached to the hook. FIG. 2C illustrates a high-pull-force magnet attached to the hook shank and clear of the hook eye.

FIGS. 3A-C illustrate non-limiting positions within the zone (I) for locating a high-pull-force magnet on a J-hook in accordance with the present invention. FIG. 3A illustrates a high-pull-force magnet attached to the line above the hook. FIG. 3B illustrates a high-pull-force magnet attached to the hook. FIG. 3C illustrates a high-pull-force magnet attached to the hook shank and clear of the hook eye.

FIG. 4A illustrates a high-pull-force magnet attached to the line above the hook. FIG. 4B illustrates a high-pull-force magnet attached to the hook.

FIG. 6A illustrates a buoy and high-pull-force magnet and a net with a plurality of high-pull-force magnets in accordance with the invention. FIG. 6B illustrates a barge and a high-pull-force magnet in accordance with the present invention.

FIG. 7A illustrates a surfboard with a high-pull-force magnet embedded in or attached to the surfboard in accordance with the invention. FIG. 7B illustrates a surfboard with a high-pull-force magnet that is capable of spinning in accordance with the invention. FIG. 7C illustrates a high-pull-force magnet or magnets that are capable of spinning when placed in water. Such a spinning high-pull-force magnet may comprise individual magnets attached to a hub that is attached to an axle to allow free spinning of the high-pull-force magnet or magnets attached to the surfboard when water current is present.

FIGS. 8A-C illustrate exemplary accessories for attaching a high-pull-force magnet to a human or other subject or object. FIG. 8A illustrates a belt or weight belt with a high-pull-force magnet in accordance with the invention. FIG. 8B illustrates a bracelet or wristband with a high-pull-force magnet in accordance with the invention. FIG. 8C illustrates flippers for snorkeling or diving with a high-pull-force magnet in accordance with the present invention.

DETAILED DESCRIPTION OF THE INVENTION

Figure 1:
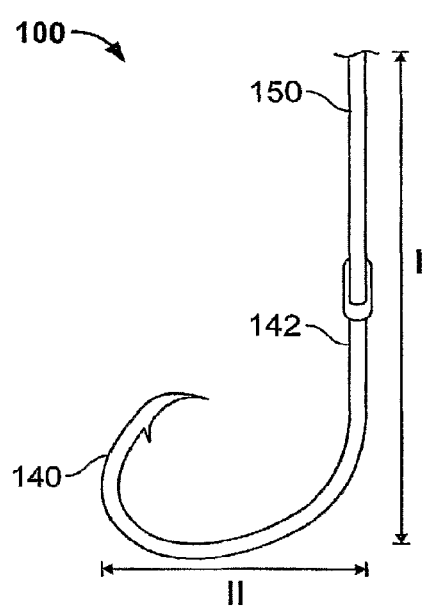
FIG. 1 illustrates a traditional circle hook attached to a line and a non-limiting preferred zone (I) for locating a high-pull-force magnet in accordance with the present invention.

"By-catch" is any kind of fish that is caught in a fishing operation wherein the fish is not the object of the fishing operation. For example, if the target fish of a longline fishing operation is tuna, an elasmobranch caught on a hook of the longline is by-catch.

"Elasmobranchs" in this specification means one or more elasmobranchii in the super-orders Galeomorphii and Squalomorphii and orders Squaliforms (dogfish), Carcharhiniformes (requiem sharks), Lamniformes (mackerel sharks), and certain Orectolobiformes (carpet sharks). Elasmobranchs in this specification includes nurse sharks, an Orectolobiforme, but this specification does not include the other carpet sharks, such as wobbegongs.

"Gauss" is a measure of magnetic field strength. Gauss is a unit of the density of a magnet's flux (or flux density) measured in centimeter-gram-second. A tesla is equal to 10,000 gauss. Gauss and tesla are common units for referring to the power of a magnet to attract (or repel) other magnets or magnetic materials. The Gauss unit describes both the coercivity of a magnet and its saturation magnetization. Gauss describes how strong the magnetic fields are extending from the magnet and how strong of a magnetic field it would take to de-magnetize the magnet.

"Grade" of a neodymium-iron-boride magnet specifies the quality of material used to construct the magnet. All else being equal, the higher the quality of materials used to construct the magnet, the greater the magnet's strength. In grading neodymium-iron-boride magnets, a lower grade, e.g., N35, does not have as much magnetic strength as a higher grade, e.g. N45.

"Longline" refers to a fishing line that may extend up to many miles wherein a mainline extends the full length of the longline and individual shorter gangion lines attached to the mainline are spaced at set intervals (perhaps several feet or meters or perhaps 1000 feet or greater apart). Hooks are attached to the individual gangion lines. Hooks may be baited and used to catch target fish. The addition of a magnet of sufficient strength repels elasmobranchs from the baited hooks as well as from the region of the longline generally.

"Nominal strength" of a magnet is measured in gauss or tesla and reflects the theoretical strength of a magnet at its core. Nominal strength is a function of the grade of a magnet. The higher the grade, the higher the nominal strength. Nominal strength is the strength necessary to demagnetize the magnet.

"Pull force" is the attractiveness of a magnet to a mild steel flat surface in pounds. The formula for calculating pull force is provided in detail herein.

"Target fish" is any kind of fish, the catching of which is the object of a fishing operation. For example, the target fish of a longline fishing operation may be tuna. A fish that is caught on the longline that is not tuna would not be a target fish.

"Tonic immobility" is the state of paralysis that typically occurs when an elasmobranch is subject to inversion of its body along the longitudinal axis of the body, i.e., is belly up. An elasmobranch can remain in this state for up to 15 minutes.

I. HIGH-PULL-FORCE MAGNETS AS REPELLENTS OF ELASMOBRANCHS

It has been discovered that high-pull-force magnets repel elasmobranchs. High-pull-force magnets comprising a pull force of about 50 pounds or greater introduced into the environment of an elasmobranch have demonstrated repelling action on elasmobranchs. Likewise, magnets comprising a nominal strength of greater than about 0.5 teslas (5000 gauss) have demonstrated repelling action on elasmobranch. Further, magnets producing about 5,000 mG to about 500,000 mG of magnetic strength at a distance of about 0.01 m to about 1 m from the magnet or about 10,000 mG to about 320,000 mG of magnetic strength at a distance of about 0.1 m to about 0.4 m from the magnet have demonstrated repelling action on elasmobranchs.

High-pull-force magnets may be employed near fishing lines, fish hooks or fishing nets to repel sharks from bait, hooks or nets that have been set for target fish (not sharks). High-pull-force magnets may also be employed near people, animals or objects in the water to repel elasmobranchs from frightening or injuring the people, animals or objects in a particular area.

Sufficient magnetic force to repel elasmobranchs may be measured in a number of ways. Magnetic force may be measured as pull force, as nominal magnetic strength at the core of the magnet (in gauss) or at a distance of interest from the magnet (in gauss). Any measurement known to an artisan practicing the invention may be useful.

The high-pull-force magnet may be a permanent magnet or an electromagnet. Magnets made of neodymium-iron-boride (NdFeB) are preferred, given present magnet technology, since these magnets have high pull force relative to their physical size. A coating, such as nickel, may protect permanent high-pull-force magnets from corrosion in water. A preferred NdFeB magnet, in accordance with the present invention, may have a grade of about N38 through about N50 or greater.

A high-pull-force magnet for repelling elasmobranchs may comprise the shape of a cylinder, a cone, a circle, a cube, a disk, a bar, a sphere, a plate, a rod, a ring, a tube, a stick, a block, a tapered cone, or any other shape. The high-pull-force magnet may further comprise a hollow portion for stringing, like beads, on a fishing hook, line, belt, bracelet or rings. A high-pull-force magnet comprising a cylinder with a diameter of about 4 inches to about 8 inches and a thickness of about 1 inch to about 4 inches is preferred. A magnet with a diameter of about 4 inches and a thickness of about 1.5 inches is most preferred.

High-pull-force magnets having a pull force of about 50 pounds or greater have demonstrated repelling activity on elasmobranch species at distances as great or greater than 0.3 m from the elasmobranches. Further, a longline fitted with a series of seven magnets set more than 100 feet apart has shown repelling activity across an entire longline of about 2000 feet. As such, high-pull-force magnets in accordance with the invention may be used to repel elasmobranches. The repelling activity of high-pull-force magnets may be useful in the commercial fishing industry to reduce elasmobranch by-catch and predation, and useful to repel elasmobranchs from humans in the environment of an elasmobranch or repel elasmobranchs from an area of interest.

The mode of action of high-pull-force magnets on elasmobranchs is not fully understood. While not wishing to be bound by any particular theory, one plausible theoretical explanation for this surprising finding of repellent activity of high-pull-force magnets is the possibility that electrical eddy currents are generated by an elasmobranch moving through the strong magnetic field created by the high-pull-force magnet. The resulting eddy currents may over stimulate ampullae of Lorenzini (known to be used by elasmobranchs for navigation and orientation) causing the ampullae of Lorenzini to disorient the elasmobranch or otherwise signal danger to the elasmobranch causing aversive behavior.

Several species of sharks have demonstrated the ability to sense magnetic fields (Kalmijn, 1978; Ryan, 1980; Klimley, 1993; 2002) but were not repelled by the use of such magnets. The ampullae of Lorenzini organ within sharks is used to detect weak electrical fields at short ranges, which functions in the final stages of prey capture: usually when a shark is inches from its prey. A shark's prey emits weak electric fields that are detectable to the shark. As a shark approaches prey, the shark can sense the weak electric field emitted therefrom. In the natural environment, the detection range of the shark's ampullae of Lorenzini is effective only within inches of an object. As magnetic field strength is increased elasmobranchs sense the magnetic field at much greater distances, such as 0.3 m or greater. When a plurality of magnets are introduced across a large area or region (such as along a fishing longline) sharks may sense a powerful magnetic field at close range spanning an area/length of 1000 feet.

Magnetic fields generated by high-pull-force magnets such as permanent magnets are effective repellents for elasmobranchs, excluding certain carpet sharks in the Orectolobidae family. It is believed that high-pull-force magnets are not effective repellents against certain carpet sharks, particularly spotted wobbegongs (Orectolobus maculatus), because they ambush predators and rely more on visual, olfaction, and lateral line clues than this magnetic sense. This species of shark is found chiefly in Australia and Indonesia, and does not represent significant by-catch species or species that are known to be aggressive against humans. Magnets, however, are effective against nurse sharks in the Orectolobiform family.

While not wishing to be bound by a particular theory, the flux of a permanent magnet, such as an NdFeB magnet, may correlate with the detection range of the ampullae of Lorenzini. Since, the magnetic flux from a magnet decreases at the inverse cube of the distance from the magnet, at only a few meters distance the magnetic field exerted by the magnet is less than the Earth's magnetic field. As such, repelling of elasmobranchs with magnets appears to occur within several meters of a high-pull-force magnet. Additionally, if a series of high-pull-force magnets is spaced in a region, a measurable level of repelling appears to occur over the entire region.

High-pull-force magnets have been demonstrated by Applicant to act as acceptable repellents of elasmobranchs. The repellent activity of high-pull-force magnets has been shown to be better than existing shark-repellent technology with the exception of certain chemical repellents being developed by SHARK DEFENSE LLC that have a greater range of action.

A. Magnetic Forces

The force of a magnet may be measured in a variety of ways. Gauss is a unit of the density of a magnet's flux (or flux density) measured in centimeter-gram-second. A tesla is equal to 10,000 gauss. Gauss and tesla are known common units for referring to the power of a magnet to attract (or repel) other magnets or magnetic materials. The Gauss unit describes both the coercivity of a magnet and its saturation magnetization. Basically, it describes how strong the magnetic fields are extending from the magnet and how strong of a magnetic field it would take to de-magnetize the magnet.

The pull force of a magnet is related to the magnet's nominal strength in gauss or teslas but uses the nominal strength to create a practical measure of a magnets ability to apply a pulling force on materials that are attracted to a magnetic field, such as ampullae of Lorenzini in elasmobranch. Pull force is related to the flux density of the magnet's magnetic field (in gauss or tesla) and the shape of the magnet. Pull force is calculated using the following equation: Pull Force=$0.576 \times Br^2 \times (Th) \times A^{1/2}$ where Br=Flux Density in KiloGauss, Th=Thickness of Magnetized Surfaces in inches and A=Surface Area of the magnet in inches. Using this equation, a magnet's pull force may be determined A high pull force value for magnets is greater than about 50 pounds.

The strength of a magnet's magnetic field is inversely related to the distance an object is from the magnet. As such, magnets of very low strength (or gauss) may repel elasmobranchs if the elasmobranch moves close enough to sense the magnetic field of the magnet. A high-pull-force magnet having sufficient strength to repel an elasmobranch at sufficient distance such that the elasmobranch is deterred from striking a baited hook or coming near a person or other subject is preferred. It is more preferred that a high-pull-force magnet have a pull force of at least 100 pounds to provide sufficient magnetic force to repel an elasmobranch away from a baited hook or a person before the elasmobranch may bight the hook or harm the person. Because an elasmobranch may act to strike a hook or person at a distance from the target, the stronger the high-pull-force magnet, the more effective it will be. It has been reported that magnets have a beneficial health effect in humans and a negative health effect in humans at high power. Applicant makes no representation herein of the safety of use of high-pull-force magnets by humans during short- or long-term use.

II. METHODS AND DEVICES FOR MAGNETIC REPELLENTS

A. Magnets

Exemplary and non-limiting high-pull-force magnets in accordance with the invention may be constructed of any material that is capable of generating a magnetic field without requiring an outside energy source (such a permanent ferrous magnet). Magnetism may be generated in any manner known to the skilled artisan who is practicing aspects of the invention.

There are many varieties of permanent magnet materials including neodymium magnets (which are some of the most powerful permanent magnets known at this time), samarium-cobalt magnets, ceramic magnets, plastic magnets, Alnico magnets as well as traditional ferrous magnets. Any magnetic material having sufficient pull force may be used as a repellent of elasmobranchs.

Exemplary permanent magnets include neodymium-iron-boride (NdFeB) magnets, ferrous metal magnets, samarium-cobalt magnets, or any other magnetic material. High-pull-force magnets may be flexible or inflexible. High-pull-force magnets may be made of sintered metal powder or of metal or any other magnetizable material.

A preferred magnetic material for high-pull-force magnets contemplated within an aspect of the invention is NdFeB. NdFeB is a more preferred material than ferrous magnets, flexible magnets or samarium-cobalt magnets. Flexible magnetic strips may be constructed from magnetic powder such as ferrous or other powder mixed with polymer bonding material such as rubber-like material. Samarium-cobalt magnets are less preferred in that they may be more brittle than other magnets.

In selecting a high-pull-force magnet, a pull force of about 50 pounds or greater is preferred. A pull force of about 100 pounds or greater is more preferred since the impact of the magnetic field will felt at a greater distance from the magnet.

Neodymium-iron-boride magnets, commonly called "rare earth," "NdFeB," or "NIB" magnets, typically meet or exceed residual inductances greater than about 5,000 gauss, which is preferred. Residual inductance defines how changing magnetic fields generate electric currents and is also measured in gauss.

In order to maximize high pull force, the surface area of a magnet may be maximized. For example, a 6" diameter by 2" thick cylindrical N38 NdFeB magnet (nominal strength 13000 gauss; pull force 1042 pounds) may be effective in repelling elasmobranchs at a range of 6".

A plurality of magnets may be employed to repel elasmobranchs. For example, 1" cube magnets may be arranged in a 12" long bar and used to repel elasmobranchs. The cube magnets may be of any magnetic material capable of producing sufficient magnetic strength at any distance of interest from the magnet to repel elasmobranchs.

Alternatively, a plurality of 1" cube magnets may be arranged linearly with a distance between each magnet. The magnets may be arranged linearly with positive poles facing one another or may be arranged with positive poles facing negative poles. Smaller magnets are also effective in repelling elasmobranchs and may preferably be arranged to maximize surface area presented to an oncoming elasmobranch.

Metals with special magnetic properties may be used in conjunction with permanent magnets in order to maximize or shape the magnetic flux profile of the magnet and thereby increase the pull force by directing the magnetic force more powerfully at an elasmobranch of choice. For example, holmium metal, which possesses the highest magnetic moment of the known elements, may be used to optimize the magnetic flux profile. A 1.5" holmium ring with a drilled 0.5" diameter center, coupled to an NdFeB 1.5" diameter cylindrical magnet, produced aversive reactions in immobilized sharks when the holmium end was oriented to the shark's nares. Other materials that may also be used, among others, for controlling the shape of the magnetic flux of a magnet may be gadolinium; pyrolytic graphite; mu-metal (a nickel-iron alloy comprising copper and molybdenum that has a very high magnetic permeability and is, therefore, very effective at screening magnetic fields); and bismuth.

To protect permanent magnets from corrosion when placed in water, permanent magnets may be coated with any coating that will reduce corrosion and preserve the magnetic force of the magnet. For example, magnets may be coated with nickel, rubber, plastic, acrylic, enamel, paint or other coating. Nickel-plated NdFeB magnets are an example of preferred high-pull-force magnets so long as the coating remains intact.

It may be desirable to encase a magnet in paint. Black paint is a preferred paint color to avoid underwater reflections and flashes of sunlight from the magnet's surface that can act as an attractant. A magnet may also be enclosed in any waterproof housing, such as a polymer coating.

B. High-Pull-Force Magnets in Combination with Hooks

A non-limiting aspect of the present invention is the use of high-pull-force magnets to repel elasmobranchs from baited hooks. Exemplary and non-limiting combinations of a high-pull-force magnet and a hook are illustrated in FIGS. 1-4. For example, in FIG. 1, an exemplary and non-limiting circle hook and line (100) are illustrated wherein a circle hook (140) is attached to a line (150) along with an exemplary and non-limiting Zone I in the circle hook and line where a high-pull-force magnet may be placed or affixed. The preferred region (Zone I) for magnet placement along the line (150) or shank (142) of the hook is any region wherein the affixed or placed magnet does not obstruct the hook gap distance (Zone II). Not more than 20% of the hook gap distance (Zone II) is preferably obstructed by the magnet such that the hook is not prevented from being baited or setting in the corner of the mouth of a target fish. Nevertheless, any arrangement wherein the hook is not prevented from catching target fish is acceptable. Tapered conical designs (not illustrated) are contemplated such that the diameter of the high-pull-force magnet at the hook end is smaller than the diameter of the high-pull-force magnet at the line end of Zone I.

Figure 2A:
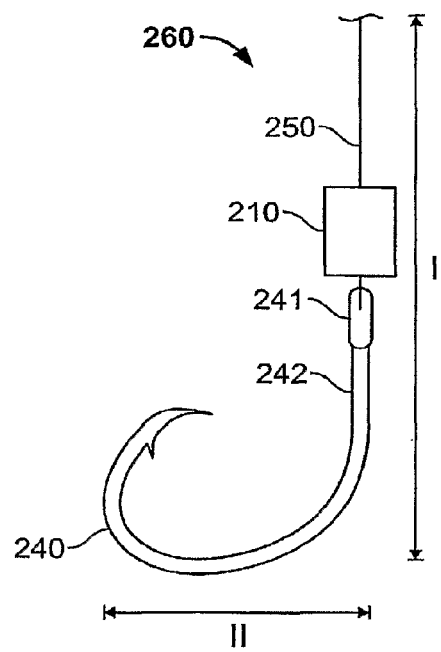
FIGS. 2A-C illustrate non-limiting positions within the zone (I) for locating a high-pull-force magnet in accordance with the present invention.
Figure 2B:
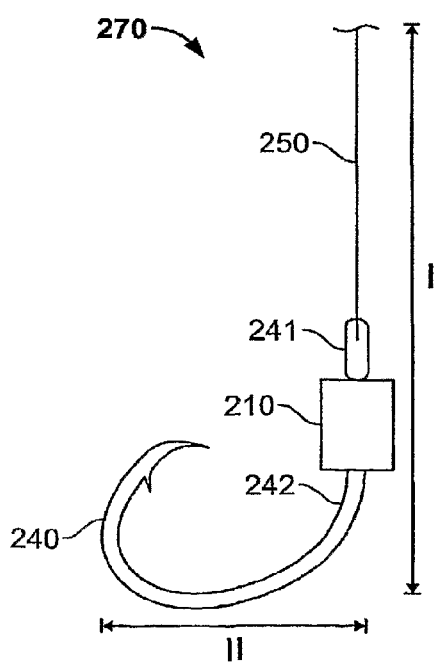
Figure 2C:
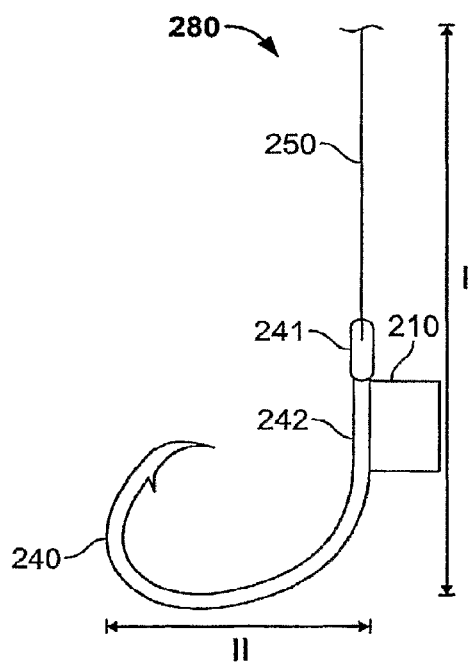

Exemplary and non-limiting combinations of a high-pull force magnet on a hook and line are illustrated in FIGS. 2A-C. As in FIG. 2A, a high-pull-force magnet (210) may be placed in proximity to a circle or offset circle hook (240) attached to a line (250) so that it rests on the hook eye (241) providing an exemplary embodiment such as the hook-magnet combination embodied at 260. As in FIG. 2B, a high-pull-force magnet (210) may be placed in proximity to a circle or off-set circle hook (240) so that it rests on the shank (242) of the hook providing an exemplary embodiment such as the hook-magnet combination embodied at 270. As in FIG. 2C, a high-pull-force magnet (210) may be placed on a circle or offset circle hook (240) so that it is secured to the outside of the shank (242) and the hook eye (241) providing an exemplary embodiment such as the hook-magnet combination embodied at 280. A high-pull-force magnet may be affixed outside the shank (241) of a hook simply by the magnetic force of the high-pull-force magnet. Vinyl electric tape (not illustrated) may be used to secure the high-pull-force magnet. Black vinyl tape is preferred to reduce reflections of light.

High-pull-force magnets may be provided in any shape. It is preferred that a magnet's shape not significantly obstruct the hook gap distance (zone II). The magnet may comprise a hole through which a lead, or gangion, or mainline or other filamentous object may pass. Exemplary non-limiting shapes may include a cube or block of any size or other object having at least one plane comprising four right angles and a hole passing through the object such that fishing line or other filament may be passed through to affix the magnet in place on fishing tackle or other object. Alternative, non-limiting shapes may also include cylindrical or other circular, oval or oblong three-dimensional shapes having a hole passing through some portion of the shape. Alternative, non-limiting shapes may also include a hollow pyramid or a hollow trapezoid.

Alternative, non-limiting shapes may also include a solid cube or similar shape, a solid rectangle or similar shape, a solid bar or similar shape, a solid pyramid or similar shape, a solid trapezoid or similar shape or any other shape. Magnets may be shaped as a ring, a trapezoid, a series of trapezoids, a series of trapezoids arranged in a larger ring pattern, a cone, a tapered cone, a narrow or wide cylinder or in the shape of a Billy club. Preferably, the shape when combined with a hook provides a hook in proximity to a magnet comprising sufficient magnetic field strength to repel elasmobranchs.

Exemplary and non-limiting combinations of a high-pull-force magnet and a hook are also illustrated in FIGS. 3A-C. As in FIG. 3A, a high-pull-force magnet (310) may be placed in proximity to a j-hook (340) on a line (350) such that it rests on the hook eye (341) providing an exemplary embodiment such as the hook-magnet combination embodied at 360. As in FIG. 3B, a high-pull-force magnet (310) may be placed in proximity to a j-hook (340) such that it rests on the shank (342) of the hook providing an exemplary embodiment such as the hook-magnet combination embodied at 370. As in FIG. 3C, a high-pull-force magnet (310) may be placed on a j-hook (340) such that it is secured to the outside of the shank (342) and the hook eye (341) providing an exemplary embodiment such as the hook-magnet combination embodied at 380. As described above in the illustration of FIG. 2, magnets may be provided in any shape.

Figure 4A:
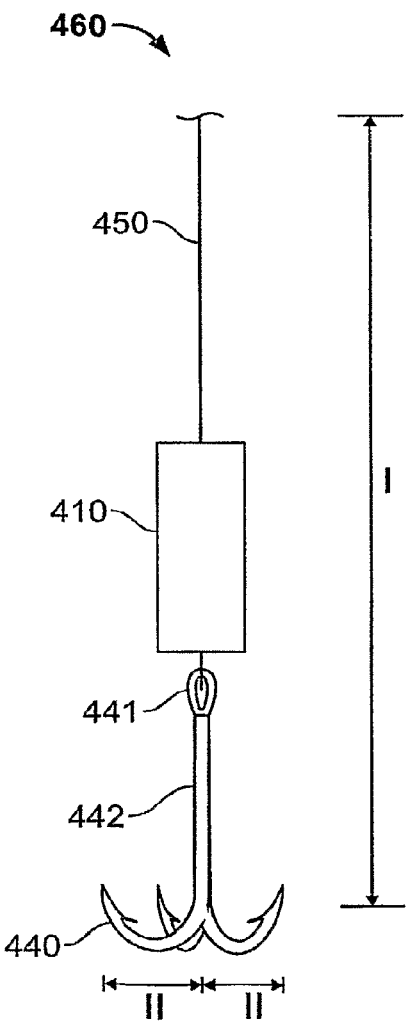
FIGS. 4A-B illustrate non-limiting positions within the zone (I) for locating a high-pull-force magnet on a treble hook in accordance with the present invention.
Figure 4B:
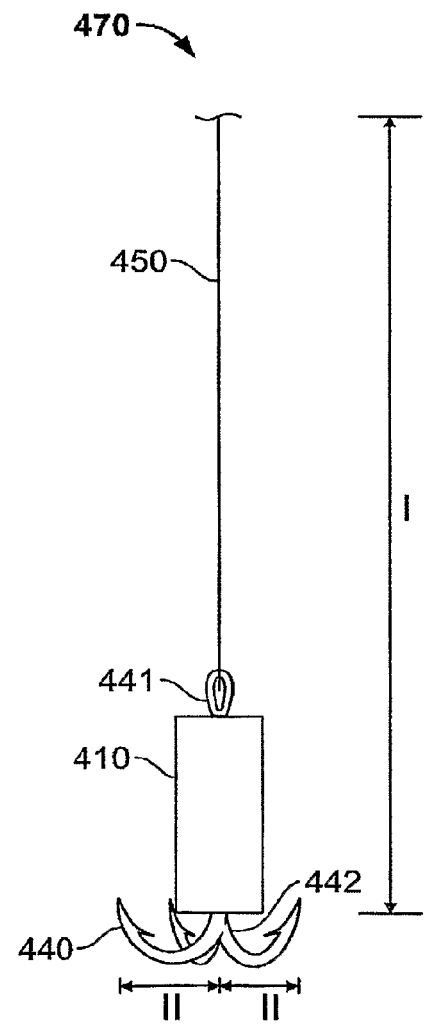

Exemplary and non-limiting combinations of magnet and hook are also illustrated in FIGS. 4A-B. In FIG. 4A, a high-pull-force magnet (410) may be placed in proximity to a treble hook (440) on a line (450) such that it rests on the hook eye (441) providing an exemplary embodiment such as the hook-magnet combination embodied at 460. As in FIG. 4B, a magnet (410) may be placed in proximity to a treble hook (440) such that it contacts the shank (442) of the hook providing an exemplary embodiment such as the hook-magnet combination embodied at 470.

A hook in accordance with the invention may be any hook that is capable of catching target fish. The hook may comprise stainless steel, steel, galvanized metals, ferromagnetic metals or any other material, metallic or plastic or any other composite.

A high-pull-force magnet in accordance with an aspect of the invention may comprise any magnetic material.

C. High-Pull-Force Magnets on Longlines

Figure 5:
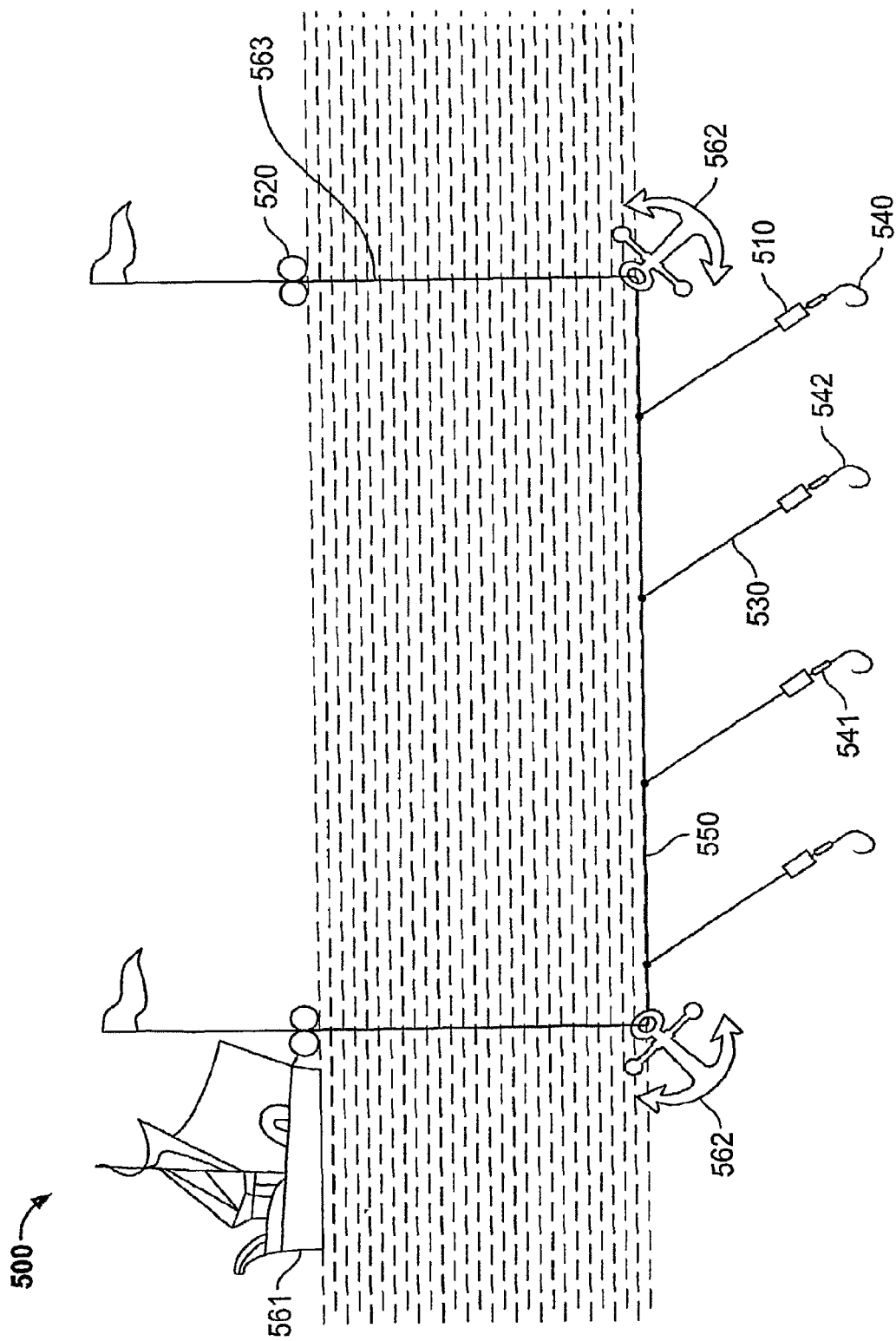
FIG. 5 illustrates an exemplary demersal longline with a high-pull-force magnet in accordance with the present invention.

An exemplary and non-limiting method of repelling elasmobranchs involving repelling elasmobranchs from longlines in accordance with the invention is illustrated in FIG. 5. A longline (500) may be deployed from a boat (561) to fish for a target fish of interest. The main line (550) of the longline may be attached to a buoy (520) and at a set distance from the buoy may be attached to an anchor (562). A set of gangions (530) with hooks (540) may be attached to the mainline beginning at the anchor (562) and may be spaced sufficiently to limit interaction between individual gangion lines (530). Each hook may have a magnet (510) mounted resting on the hook eye (541). Alternatively, the magnet may be mounted on a hook shank (542) or may be secured to the outside of the hook (540). The hooks may be baited. The longline may be a demersal longline such that the main line is proximal to the ocean or otherwise water's floor. The longline may be a pelagic long line, such that the main line is nearer to the surface of the water, suspending in the water column, typically at about 100 to about 500 feet below the surface. In the aspect of the invention where the longline is a pelagic longline, anchors (562) may have less weight or may be absent from the longline apparatus. The longline may also be a semipelagic longline wherein the mainline is further down the water column from the surface as compared to a pelagic line but is not proximal to the water's floor or is not proximal to the water's floor on at least one end of the longline. Use of magnets with longlines reduces by-catch of elasmobranchs.

Longlines comprising magnets may be handled in the commercial environment in a manner similar to those practices known in the art of longline commercial fishing. Because hooks must be carefully managed to control tangling and hooking of objects on a longlining boat, including other portions of the tackle of the longline, commercial fishing operations and those of skill in the art will recognize how to handle longlines with hooks. High-pull-force magnets on longlines likewise may be handled in the same manners as one would consider appropriate in the art to avoid entanglements of magnets or magnets sticking together. The long distances between gangions (often more than 100 feet) allow for commercial fishing operators to provide sufficient distance between magnets to avoid the magnets sticking together during fishing or during handling of tackle. Further, high-pull-force magnets used for longlines are of sufficiently small size and magnetic force that the magnets may be separated from one another by hand if they do become stuck together.

As described above, high-pull-force magnets of any size may be used in combination with a longline hook so long as the target fish may be caught on the hook. An exemplary high-pull-force magnet on a longline hook may be 2"×0.25"× 2". Smaller high-pull-force magnets are also acceptable. High-pull-force magnets of less than 0.5" cubed may be appropriate for smaller hook settings. Smaller high-pull-force magnets having sufficiently powerful magnetic fields such as N48 grade NdFeB are more preferred.

D. High-Pull-Force Magnet Repellents on Buoys, Nets and Barges

Figure 6A:
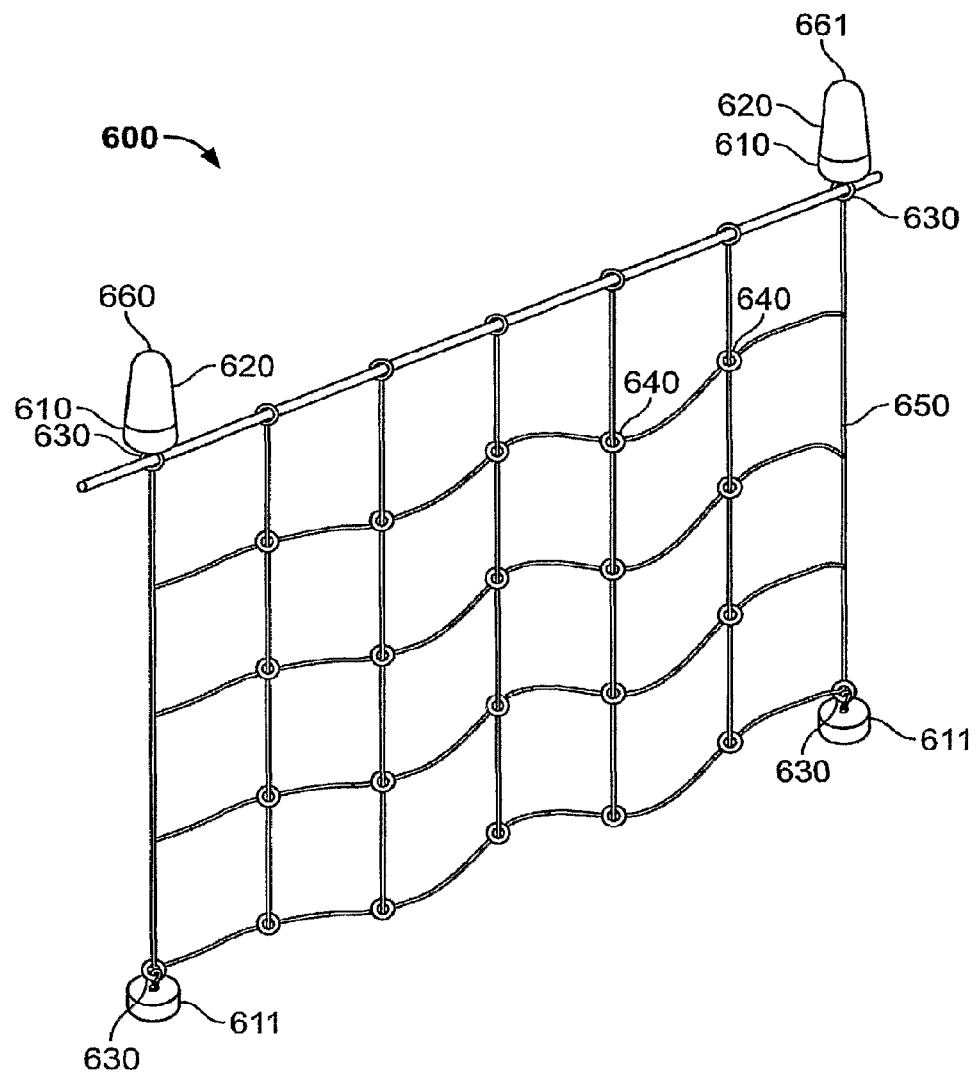
FIGS. 6A-B illustrate non-limiting devices for repelling elasmobranchs in accordance with the present invention.
Figure 6B:
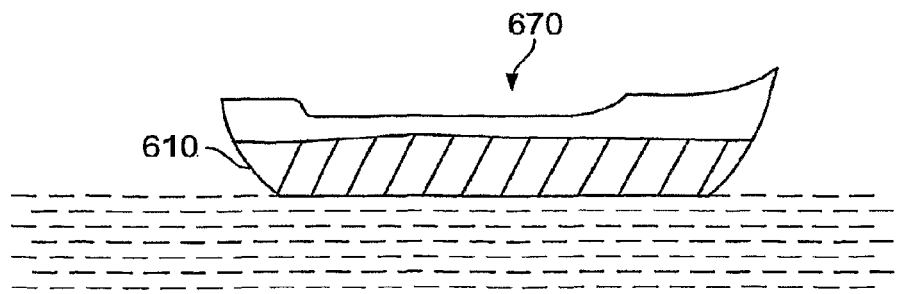

An exemplary and non-limiting method of repelling elasmobranchs with a high-pull-force magnet or a plurality of high-pull-force magnets placed on a buoy or barge or net is illustrated in FIGS. 6A-B. Buoys with high-pull-force magnets as their weighted bases are shown as element 660 and 661 in FIG. 6A. The floating portion of the buoy (620) allows the buoy to float while the high-pull-force magnet portion of the buoy (610) remains in the water because of its weight. A series of buoys comprising high-pull-force magnets may be placed in a region to repel elasmobranchs or may be placed around a swimming area or rescue area to repel elasmobranchs. A series of buoys with high-pull-force magnets may be accompanied by a series of high-pull-force magnets submerged (611) in an area of interest, such as a swimming area. As illustrated in FIG. 6B, very large high-pull-force magnets may be placed on a large floating barge (670) comprising a high-pull-force magnet (610).

An exemplary and non-limiting device for repelling elasmobranchs with a plurality of magnets is illustrated in FIG. 6A as element 600, an elasmobranch repelling net apparatus. Buoys (660 and 661) may be employed to float a net (650) comprising a series of magnets (640) held within the net and magnetic rings (630) holding the ropes of the net together. The net may be strung to the bottom of the water column using weighted magnets (611). The net may be anchored to a specific location to provide a physical barrier. The net may provide a curtain of magnetic field to repel elasmobranchs from an area or to keep elasmobranchs from entering an area of interest, such as a swimming or working area. A net (650) comprising magnets such as those illustrated as elements 610, 611, 630 and 640 may also be used to trawl for fish, shrimp or other aquatic species. In another non-limiting aspect of the invention, high-pull-force magnets may be placed in aquaculture cages to repel sharks from predation or scavenging of cultured stock. High-pull-force magnets are useful to prevent damage by elasmobranchs to aquaculture cages, nets or other equipment.

E. Surfboard Fitted with High-Pull-Force Magnet

Figure 7A:
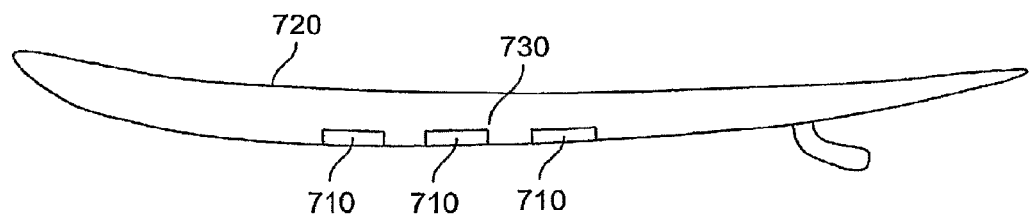
FIGS. 7A-C illustrate non-limiting exemplary surfboards with a high-pull-force magnet in accordance with the invention.

A non-limiting repelling device in accordance with the invention may comprise a surfboard comprising a high-pull-force magnetic device. FIG. 7A illustrates exemplary surfboards in accordance with an aspect of the invention. A surfboard (720) may comprise a high-pull-force magnetic device such as a permanent high-pull-force magnet (710) imbedded, affixed, attached or otherwise associated in any manner contemplated by one of skill in the art with the surfboard. A permanent high-pull-force magnet may be pressed into a space drilled into the surfboard (730). It may also be affixed with glue, waterproof tape, Velcro or any other mechanism known in the art now and hereafter.

Figure 7B:
Figure 7C:
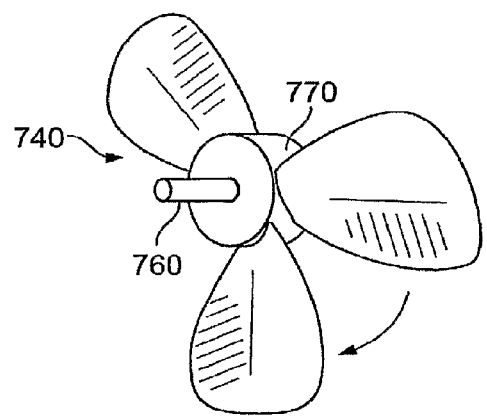

In an alternative non-limiting example in FIG. 7B, a surfboard (750) may comprise a high-pull-force magnet or plurality of high-pull-force magnets in association with one another wherein the high-pull-force magnet or magnets are capable of spinning when placed in water (740). Such a spinning high-pull-force magnet (740) may comprise individual magnets attached to a hub (770) that is attached to an axle (760) to allow free spinning of the high-pull-force magnet or magnets attached to the surfboard (750) when water current is present.

A high-pull-force magnet may be enclosed in the body of a surfboard or other watercraft or may be trailed behind a surfboard, other watercraft or swimmer.

F. High-Pull-Force Magnet Repellents on Swimming and Diving Clothing and Accessories One exemplary non-limiting aspect of the present invention comprises a magnetic material for producing a magnetic field near a swimmer or diver or other person or object in an elasmobranch environment.

High-pull-force magnets, such as, for example, high-pull-force NdFeB magnets or other high-pull-force permanent magnets may be worn as a bracelet or a band or otherwise placed in proximity of a person or object. An increase in the number of high-pull-force magnets and an increase in the grade of high-pull-force magnets that may be worn increases the magnetic field around the wearer and increases the repelling activity of the bracelet, band or other magnet article. Research on captive nurse sharks suggests that such a bracelet is effective in repelling sharks. Using a vinyl-walled tank, high-pull-force magnets were waved outside the tank wall near a resting nurse shark inside the tank. The shark had no olfactory, motion, sound, or visual clues. In seven separate observations, the nurse shark always rapidly fled from its resting site once the high-pull-force magnet was waved on the tank wall near the subject.

In a non-limiting example, an omnidirectional permanent magnetic field may be affixed or arranged near a subject or object exposed to an elasmobranch environment. The permanent magnetic field may be generated from, for example, a permanent magnet or an electromagnet. A permanent magnet may be affixed, for example, to any portion of a swimmer's or diver's body such as the head, the leg, the arm, the torso, the ankle, the wrist, or any other portions of the body.

FIGS. 8A-C illustrate non-limiting examples of permanent high-pull-force magnets (810) attached to a belt (801) (FIG. 8A) or bracelet (802) (FIG. 8B) or flippers (803) (FIG. 8C).

Figure 9:
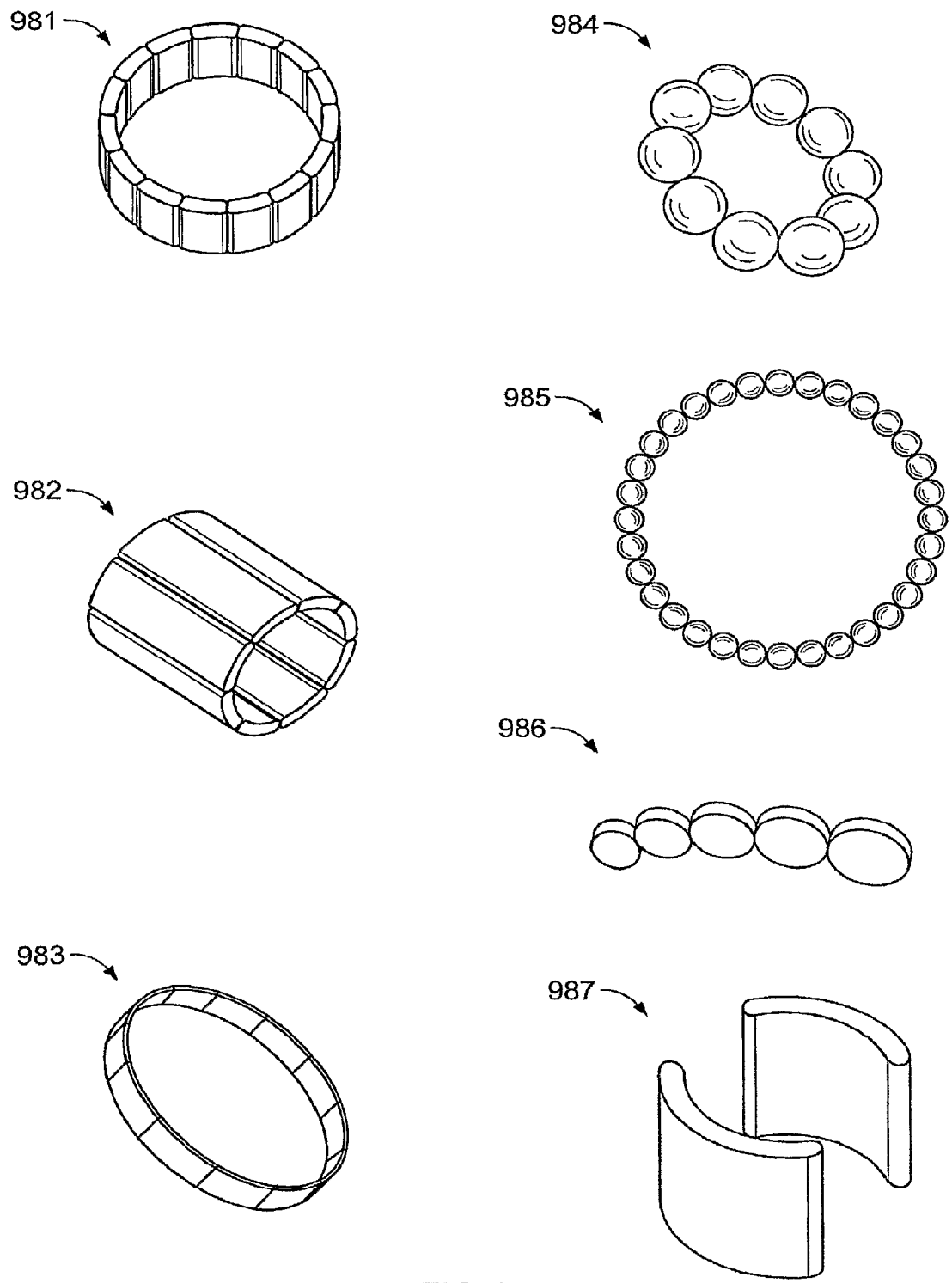
FIG. 9 illustrates a plurality of high-pull-force magnets arranged into exemplary bracelets, belts or attachable rings in accordance with the invention.

FIG. 9 illustrates a variety of non-limiting alternative designs for bracelets, belts or rings constructed solely from high-pull-force magnets. A plurality of bar magnets (981) (982) (983), larger spherical magnets of varying sizes (984) or smaller spherical magnets (985) may be shaped into a bracelet or belt. A plurality of discs (986) may be shaped into a bracelet or a belt or any shape that keeps the magnets in proximity to the body. Two concave bar magnets (987) may be placed on the ankle or wrist opposite each other such that they are held in place on the ankle or wrist by attractive magnetic forces.

The bracelets in FIG. 9 may be flexible and may be modulated to fit a portion of the body. Individual magnets of the bracelet may be easily separated and placed on the ankle or wrist.

The disks (986) may be magnetized on their edges and not magnetized on their faces. As such, the disks may be assembled as a ring using magnetic connections on their edges. The disks may be manipulated and may be returned to a circle. As such, they may conform to a ring to attach to any type of clothing, equipment or body part to which a ring may be attached.

High-pull-force magnets may likewise be attached to clothing or water accessories such as swim trunks, wet suits, headbands, flippers, goggles or other piece of clothing or accessory. High-pull-force magnets may be sewn into such clothing or may be affixed with tape, glue, Velcro or any other mechanism for affixing to clothing or accessories for swimming, diving or otherwise working or playing in water.

Many human-shark interactions in shallow water, especially around the State of Florida in the United States, are hypothesized to be "mistaken identity" by the shark in water with poor visibility. The blacktip shark (*C. limbatus*) and nurse shark (*G. cirratum*) are often implicated in these encounters. The sharks do not have an olfactory clue in most of these "mistaken identity" cases. A series of high-pull-force magnets, such as NdFeB high-pull-force magnets or other strong permanent high-pull-force magnets, may be used as means to repel the shark as it approaches within a few inches of the magnets. With a strong high-pull-force magnet, such as NdFeB, or an increased number of high-pull-force magnets, to increase magnetic field strength, repellent activity increases and the chance that a shark will be repelled prior to an investigatory bump or bite is greatly increased.

The invention is further described with the following non-limiting examples, which are provided to further illuminate aspects of the invention.

III. EXAMPLES

Example 1

Pull Force of High-Pull-Force Magnets

Some of the high-pull-force magnets that have been used in examples in this application are listed below in Table 1 with calculation of the pull force of the respective high-pull-force magnets based on the geometry, size, grade and nominal strength (conservative BR) of the high-pull-force magnet.

TABLE 1

| Geometry | Size | Grade | Conservative Br (Gauss) | Pull Force (pounds) |
| --- | --- | --- | --- | --- |
| Puck magnet | 4" × 1.5" | N38 | 13000 | 521 |
| Bar | 6" × 2" × 0.5" | N48 | 13800 | 191.31 |
| Hollow cylinder | 1" × 1" with 3/16" hollow center | N42 | 13200 | 72.75 |
| 2 stacked hollow cylinders | 0.472" × 1.97" × 0.24" hollow center | N50 | 14100 | 46.7 |

TABLE 1-continued

| Geometry | Size | Grade | Conservative Br (Gauss) | Pull Force (pounds) |
| --- | --- | --- | --- | --- |
| Cube longlines | 1" × 1" × 1" | N48 | 13800 | 110.5 |

Pull force is descriptive of the attractiveness of a magnet to a steel flat surface. A shark is not a magnetic steel surface, but it does have a surface (likely the ampullae of Lorenzini) that interacts with the magnetic field of the magnet. As such, pull force is an appropriate method for measuring interaction of an elasmobranch with a magnetic field.

Example 2

High-Pull-Force Magnets as Repellents on Longlines

The following example demonstrates the elasmobranch repellent activity of high-pull-force magnets of greater than about 150 pounds of pull force on long lines. High-pull-force magnet treatments were evaluated on one demersal longline located in the middle of a large lagoon. Adjacent longlines in the same lagoon produced large shark catch (generally greater than two sharks over the 15 hooks on a line).

Seven hooks on a demersal longline of about 1000 feet were treated with 2"×0.25"×2" NdFeB N48 magnets (nominal force 14,000 gauss; pull force about 161 pounds). The high-pull-force magnets were secured at even-numbered hooks on the longline, directly above the eye of the hook and strapped to the gangion leader with black vinyl electrical tape. All hooks received bait. If the bait was lost during the experiment, the hook was re-baited while the high-pull-force magnets were not removed or replaced; only the bait was exchanged.

A large nurse shark of about 250 cm was captured on a control hook (hook with no magnet affixed) after a second re-bait. From earlier longline trials at this spot, a much higher nurse catch was expected on this line, especially since the high-pull-force magnets acted as weights and held the baits closer to the sea floor. However, only one nurse shark was caught. As such, it is believed sharks were repelled from the entire longline by the series of high-pull-force magnets affixed thereto.

TABLE 2

| Hook | Treatment | Bait | $1^{st}$ Set Bait | 2nd Re-bait Bait | Species Caught |
| --- | --- | --- | --- | --- | --- |
| 1 | None | Barracuda | Barracuda | Tuna | |
| 2 | Magnet | Barracuda | Barracuda | Barracuda | |
| 3 | None | Barracuda | Barracuda | Barracuda | |
| 4 | Magnet | Barracuda | Barracuda | Tuna | |
| 5 | None | Barracuda | Barracuda | Tuna | |
| 6 | Magnet | Barracuda | Barracuda | Tuna | |
| 7 | None | Barracuda | Barracuda | Tuna | |
| 8 | Magnet | Barracuda | Barracuda | Tuna | |
| 9 | None | Barracuda | Barracuda | Tuna | |
| 10 | Magnet | Barracuda | Barracuda | Tuna | |
| 11 | None | Barracuda | Barracuda | Tuna | |
| 12 | Magnet | Barracuda | Barracuda | Tuna | |
| 13 | None | Barracuda | Barracuda | Tuna | Nurse, 250 cm |
| 14 | Magnet | Barracuda | Barracuda | Barracuda | |
| 15 | None | Barracuda | Barracuda | Tuna | |

Example 3

High-Pull-Force Magnets as Repellents on Longlines

The following example demonstrates the elasmobranch repellent activity of high-pull-force magnets of greater than 50 pounds of pull force on long lines. A first demersal longline with eight hook sets was baited with barracuda flesh and placed in open water. No high-pull-force magnets were placed on the hooks. Five sharks were captured on the longline over 24 hours representing 5 separate shark species ranging in size from 97 cm to 240 cm. See Table 3.

TABLE 3

| Hook | Species |
|---|---|
| 1 | 1. Tiger (F), 235 cm |
|   | 2. Nurse (F) 231 cm |
|   | 3. Sharpnose (F), 97 cm |
| 2 | |
| 3 | |
| 4 | Nurse 240 cm |
| 5 | |
| 6 | |
| 7 | |
| 8 | |
| 9 | |
| 10 | |
| 11 | |
| 12 | |
| 13 | |
| 14 | Blacknose 115 cm |
| 15 | |

A second demersal longline with fifteen hook sets was baited with squid and placed in the same position in open water as the first demersal longline discussed above for 67 hours. The trial with the second demersal longline was run three months after the trial with the first demersal longline. Seven of the fifteen hooks were treated with 1"×1"×1" neodymium-iron-boride grade N48 cube magnets (pull force of about 110 pounds; nominal force around 14,000 gauss) with the high-pull-force magnet secured to the outside of the hook shank using the magnetic force of the hook and black vinyl electric tape. All hooks received bait. During re-baits, the high-pull-force magnets were not removed or replaced; only the bait was exchanged.

Two small sharks were caught on the second demersal longline. A blacknose shark of 110 cm was caught on a control line with no magnets. A sharpnose shark of 80 cm was caught on high-pull-force magnet line. The large decrease in shark catch between the first demersal longline trial (five relatively large sharks for their species) and the second demersal longline trial (two relatively small sharks) was ascribed to the presence of magnets along the longline. See Table 4.

TABLE 4

| Hook # | Trtmt | Bait | Species Caught |
|---|---|---|---|
| 1 | control | squid | |
| 2 | magnet | squid | |
| 3 | control | squid | |
| 4 | magnet | squid | |
| 5 | control | squid | |
| 6 | magnet | squid | sharpnose 80 cm |
| 7 | control | squid | blacknose 110 cm |
| 8 | magnet | squid | |
| 9 | control | squid | |
| 10 | magnet | squid | |
| 11 | control | squid | |
| 12 | magnet | squid | |
| 13 | control | squid | |
| 14 | magnet | squid | |
| 15 | control | squid | |

A third demersal longline was set with 15 hooks in the same position as the first and second demersal longlines discussed above. The third demersal longline was set within a day of the second demersal longline. Seven of the eight hooks were fixed with magnets at the same position. Magnets were small NdFeB grade N50 hollow cylinders (12 mm outer diameter×6.1 mm inner diameter). Two magnets were placed on each hook creating a total magnet length of 50 mm. Together the magnets have a pull force of about 47 pounds and a nominal force of 14,100 gauss. The demersal line was placed in the same open water position as both demersal lines in Example 3. Within a 24-hour period, 3 large (>200 cm) tiger sharks were captured, 2 on magnet treatments. The smaller (less powerful) magnets did not repel tiger sharks.

Since a larger number of sharks (and of larger size) were caught on the first and third longlines, the three trials presented in this example demonstrate that sharks were repelled from the second longline comprising magnets of sufficient magnetic strength to repel sharks. Together, the three longline trials contained in this example demonstrate repelling of sharks by magnets of sufficient magnetic strength to repel sharks across a longline.

Example 4

High-Pull-Force Magnet Terminates Tonic Immobility at Greater than 30 cm Distance Preliminary research conducted on the effects of specific magnetic fields on shark behavior suggests that weak magnetic fields (0.3-0.5 Gauss) produced by electromagnets had no significant repelling effect on juvenile nurse sharks, *Ginglymostomata cirratum*, and juvenile lemon sharks (*Negaprion brevirostris*) under tonic immobility, however, very strong magnetic fields (i.e. about 14,000 Gauss or 1.4 Tesla) produced by large (4"diameter×1.5" height) "rare earth" magnets (neodymium-iron-boride; NdFeB) (13000 gauss, pull force of 521 pounds) had a significant repelling effect on both shark species at distances of 0.3 m or less. Additional experiments on captive sharks in an offshore, sandy bottom, fenced-in enclosure were done with NdFeB high-pull-force magnets buried under the sand. Exposure of the sharks to the buried magnets resulted in "violent reorientation" as the captive sharks came into proximity of the buried high-pull-force magnets.

Example 5

Y-Maze Preference Bioassays

A Y-maze was constructed to establish a preference test to determine the repellent activity of magnets on elasmobranchs. The maze was constructed of three sections of clear acrylic 8 inch diameter tubing, connected at 33° angles to form a Y-shape. Slotted guides were secured to the entrances of each tube, to allow the insertion of a moveable door, which obstructs one exit. The entire maze was submerged in a test tank. Sharks were allowed to freely enter the maze and exit the maze. A high-pull-force magnet was placed, south pole facing the maze junction, in an obstructed leg of the maze, preventing an exit from the maze in that direction if that obstructed leg is chosen. The diameter of the tubing was sufficient to allow juvenile nurse sharks, juvenile lemon sharks, and juvenile wobbegong sharks to enter and pass through, but it was small enough to prevent the specimen from turning around within the tube.

For each trial, uncooked shrimp were used as a reward, and the south pole of a 4" diameter NdFeB nickel-coated cylindrical high-pull-force magnet (pull force 521 pounds; nominal force about 13000 gauss) was placed in the obstructed leg. One shrimp was positioned midway into the entrance tube to entice the shark to enter the maze. Two shrimp were placed midway into the exit tube, and two shrimp were placed midway into the tube containing the magnet. When the shark entered the maze and reached the Y-junction, the shark was presented with approximately the equal odor gradient from the shrimp in the exit tube and the tube containing the magnet. If the shark chose the maze without the high-pull-force magnet, it was rewarded with two additional shrimp as it exited. If the shark chose the maze with the high-pull-force magnet, it was subjected to an exponentially-increasing magnetic field as it moved down the tube. The shark could only physically back out of the high-pull-force magnet tube and into the junction. Sharks that moved into the magnet and attempted to back out were visible traumatized. Feeding observations regarding the two shrimp in the high-pull-force magnet tube were made.

Each trial was scored as follows:
+1 Subject enters the maze
+1 Subject exits the maze
+1 Subject takes the first reward shrimp just after entry (teaser)
+2 The unobstructed path is chosen at the junction
+3 At least one reward shrimp in the unobstructed path is taken
−2 The obstructed path is chosen (magnet) at the junction
−3 The specimen enters more than 6" into the obstructed path and is visibly struggling.

A perfect score=7 for each trial. If a shark became traumatized and requires removal from the maze for its own safety, a score is calculated up to the point of the rescue. A rescue is made whenever a subject appears to be highly distressed, and a physical injury is likely.

For example, a nurse shark entered the maze, took its first reward shrimp, and immediately chose the unobstructed path. As it exited, it took its two reward shrimp, and exited the maze without a change in behavior.

Score=1+1+2+3=7

In another example, a nurse shark entered the maze and took its first reward shrimp. It chose the obstructed path but was repelled by the magnet. The shark backed up into the Y-junction; reoriented itself; and exited the unobstructed path without taking the two shrimp available in the unobstructed path.

Score=1+1−2+1=1

In yet another example, a lemon shark entered the maze and took its first reward shrimp. It chose the obstructed path, and then continued down the magnet to within 6" of the magnet. It became extremely distressed and a rescue was made.

Score=1+1−2−3=−3

In an investigation, three nurse sharks were subjected to the maze. Shark 1 was subjected to the maze five times. Shark 2 was subjected to the maze 5 times but only entered the maze 4 times. Shark 3 was subjected to the maze once but required rescue when it encountered the magnet and subsequently died, apparently from stress related to exposure to the magnet. The magnet in the obstructed maze was a 4"×1.5" cylindrical NdFeB magnet of grade N48 (13000 gauss, 521 pounds pull force). The results are contained in Table 5.

TABLE 5

| | Obstruction Exit | Nurse 1 (Lg.) | Nurse 2 (Med.) | Nurse 3 |
|---|---|---|---|---|
| Trial 1 | L | 1 | 1 | −4 |
| Trial 2* | L | 5 | 1 | (rescue performed) |
| Trial 3 | R | 4 | 3 | Shark would not re-enter maze in subsequent trials |
| Trial 4 | L | 4 | 4 | |
| Trial 5 | R | 5 | Did not enter | |

The data suggest that Nurse 1 has learned to navigate the maze, retrieve a reward, and exit without distress. Nurse 2 appears to be learning, but did not re-enter on the fifth trial. Nurse 3 had to be rescued. It was notably distressed by the magnet. Unfortunately, Nurse 3 did not eat after this experience, and subsequently died at about 30 days after the experiment. We did not observe any external injuries on Nurse 3. We attribute this to stress and possibly shock from encounter with the high-pull-force magnet in the maze.

Example 6

N48 Neodymium-Iron-Boride (NdFeB) Nickel-Coated Permanent Magnet Terminate Tonic Immobility Juvenile lemon sharks (*Negaprion brevirostris*) and juvenile nurse sharks (*Ginglymostoma cirratum*) that had been placed in tonic immobility were subjected to the magnetic field of an N48 neodymium-iron-boride (NdFeB) nickel-coated 4"×1.5" cylinder permanent high-pull-force magnet and were observed. The high-pull-force magnet had the following characteristics:
Calculated Pull Force 521 pounds
Residual Induction: 14 KGs
Coercive Force: 11.0 KOe
Intrinsic Coercive Force: ≥12.0 KOe
Maximum Energy Produce: 48 MGOe
Curie Temperature: 320° C.-330° C.
Vickers Hardness: 500-600
Working Temperature: <−80° C.
Temperature Coefficient −0.11% per ° C.

A DC milligauss magnetometer (Alpha Labs, Inc.) was used to record magnetic field strength during the study. The magnetometer sensor was secured to the top of a nonmagnetic ½" polyvinyl chloride stake, which was driven vertically into the sand at the test site. The magnetometer sensor was submerged for the study. Water depth did not exceed 36" at the test site. A meter-long rule was secured to the magnetometer sensor.

A control test was preformed in order to determine if the activated magnetometer sensor would terminate tonic immobility. The magnetometer was set to zero to compensate for the background magnetic field of the earth, which allowed fluctuations from the permanent magnet to be measured. A juvenile female lemon shark in tonic immobility was held directly at the magnetometer sensor. Tonic immobility did not terminate. The magnetometer readings did not fluctuate when the lemon shark was in proximity to the sensor demonstrating no change in magnetic field strength.

Two 4" cylindrical N48 grade NdFeB nickel-coated permanent high-pull-force magnets (nominal strength 14000 gauss, pull force about 521 pounds) were calibrated by observing the magnetic field strength versus distance from the magnet under water. The following data were recorded:

TABLE 6

| Distance | milliGauss (mG) |
|---|---|
| 1.5 m | +191 |
| 1.0 m | +524 |
| 0.9 m | +700 |
| 0.8 m | +920 |
| 0.7 m | +1310 |
| 0.6 m | >+2000 |

Because the maximum reading of the magnetometer used in the experiments was 2000 mG, magnetic fields at distances less than 0.6 m from the magnet were calculated using a standard gauss calculation for a cylindrical magnet. In this case, we used the calculator provided at www.arnoldmagnetics.com/mtc/calc_gauss_cyl.htm. The following parameters were in-put into the magnetic field calculator: L=4 in.; D=1.5 in; Br=13,000 G; Z=distance from magnet.

With a juvenile shark subject to tonic immobility at the magnetometer sensor, the permanent magnet was moved along a stationary rule, level with the shark and the sensor, towards the shark. The high-pull-force magnet was not moved faster than 0.1 m/s toward the shark. The following results were obtained for termination of tonic immobility. (Note: + denotes the north pole, electrically on the gaussmeter.)

TABLE 7

| Specimen | Magnetic Pole Facing Shark | Distance (m) to terminate tonic immobility | Calculated mG |
|---|---|---|---|
| Juvenile lemon shark, | + | 0.1 | 246971 |
| Juvenile lemon shark, | − flipped + | 0.0 | 3130415 |
| Juvenile nurse shark, | − | 0.3 | 14477 |
| Juvenile nurse shark, | + | 0.3 | 14477 |
| Juvenile nurse shark, | + | 0.2 | 44154 |
| Juvenile nurse shark, | − | 0.2 | 44154 |
| Juvenile nurse shark, | + | 0.2 | 44154 |
| Juvenile nurse shark, | + | 0.2 | 44154 |

Since the movement of the permanent high-pull-force magnet underwater induces an electrical current, the next study moved the tonic shark toward two stationary high-pull-force magnets, each fixed at 1.5 m from the sensor. Tonic immobility was terminated when the sharks were brought within 0.2 m of the high-pull-force magnet faces.

It was consistently observed that tonic sharks awoke by turning away from the magnet's face. This was independent of the pole of the high-pull-force magnet, and the orientation of the shark's head toward the magnet. More violent responses occurred when the shark's head was oriented 90 degrees to the high-pull-force magnet face, rather than 0 degrees (nose-to-magnet face).

The movement of the shark toward the high-pull-force magnet, as well as the movement of the high-pull-force magnet toward the shark might create electric current and awaken the shark. To eliminate this possibility, care was taken not to move the high-pull-force magnets in a rapid manner.

Example 7

Electromagnetic Device with Lower Magnetic Strength Did Not Terminate Tonic Immobility In a first experiment using an electromagnetic device, an iron-core electromagnet was secured to the end of a PVC pole, and energized with 12 VDC using a marine wet-cell battery. Current was monitored using a digital multimeter. A tonic juvenile female lemon shark was held at the magnetometersensor, while the tip of the electromagnet was moved. The following results were obtained:

TABLE 8

| Distance between shark and electromagnet | AMPS to electromagnet @ 12VDC | Measured mG | Shark's Response |
|---|---|---|---|
| 1.0 m | 6.27 A | −10 | Did not awaken |
| 0.5 m | 6.28 A | −139 | Did not awaken |
| 0.0 m | 6.24 A | −1700 | Did not awaken |
| 0.0 m | 6.16 A (reversed polarity) | >2000 | Did not awaken |

In a second experiment using an electromagnetic device, a commercial 1000 lb.-strength waterproof electromagnet, produced by LOCKNETICS, INC., was energized with 12V DC using a marine wet-cell battery. According to the product specifications, this magnet draws a consistent 30 A at 12 VDC, which exceeded the capability of the digital multimeter. A tonic juvenile female lemon shark was held at the magnetometersensor, while the face of the electromagnet was moved. The following results were obtained:

TABLE 9

| Distance between lemon shark and electromagnet | AMPS to electromagnet @ 12VDC | Measured mG | Lemon shark's Response |
|---|---|---|---|
| 1.5 m | 30 A | −20 | Did not awaken |
| 1.0 m | 30 A | −40 | Did not awaken |
| 0.5 m | 30 A | −280 | Did not awaken |
| 0.5 m | 30 A, but flickered powered randomly instead of a constant supply | −280 | Did not awaken |
| 0.0 m | 30 A | >2000 | Did not awaken |
| 0.0 m | 30 A reversed polarity randomly | >2000 | Did not awaken |

These two experiments demonstrate that despite strong electromagnetic fields in close proximity, such fields were not sufficient to terminate tonic immobility in juvenile nurse sharks and lemon sharks. The magnetic field strength was not sufficient to terminate tonic immobility.

However, as seen above, a powerful field from an NdFeB permanent high-pull-force magnet is sufficient to terminate tonic immobility in juvenile nurse sharks and lemon sharks. It is believed that a field strength of approximately 50 G at least 0.1 m distance from am elasmobranch reliably terminates tonic immobility. 50 gauss is about 100 times the Earth's magnetic field.

Example 8

Bracelet, Belt or Other High-Pull-Force Magnet as Repellent of Shark

Two lemon sharks in an outdoor pen were placed in tonic immobility. A blinder was placed between the sharks and a magnet having about 191 pounds of pull force and a nominal strength of about 14000 gauss. Upon introducing the magnetic bar up to about 0.2 meters behind the blind, tonic immobility was terminated and the sharks violently moved in orientation away from the high-pull-force magnet.

Example 9

Bracelet as Repellent of Shark

Research on captive nurse sharks suggests that a high-pull-force bracelet is effective in repelling sharks. Using a vinyl-walled tank, high-pull-force magnets were waved outside the tank wall near a resting nurse shark inside the tank. The shark had no olfactory, motion, sound, or visual clues. In seven separate observations, the nurse shark always rapidly fled from its resting site once the high-pull-force magnet was waved on the tank wall near the subject. When non-magnetic objects were waived at the same position outside the tank, no change in behavior was observed.

Example 10

Target Fish not Repelled by High-Pull-Force Magnets

Preliminary research conducted on the effects permanent magnetic fields on adult cobia, *Rachycentron canadum*, suggests that very strong magnetic fields (i.e. >14,000 Gauss or 14 Tesla) produced by "rare earth" magnets (NdFeB) (13,800 gauss, 110 pounds pull force) had little effect on cobia during feeding. Digital video of cobia feeding within 5 cm of the "rare earth" high-pull-force magnet was recorded. In three trials sardines were offered to the cobia on PVC tubes with no magnets inside. In three subsequent trials sardines were offered on PVC tubes with a high-pull-force magnet inside. The high-pull-force magnet was composed of 4 discs (1" diameter×¼" height) stacked on top of each other with Teflon™ rings between each magnet.

In another control test, squid was presented to yellowfin tuna in the presence of an NdFeB high-pull-force magnet of grade N48. A horizontal pole with six squid (and a corresponding high-pull-force magnet) hung equally spaced along the pole was presented to the tuna. The pole was lowered into the tank. The tuna took the bait in the presence of the high-pull-force magnets. The tuna were not repelled.

The ability to selectively repel elasmobranch is useful both for longline fishing applications (to catch target fish and avoid killing elasmobranch) and for human applications, particularly for divers and snorkelers (to repel elasmobranchs and not repel fish).

What is claimed is:

1. A method for repelling an elasmobranch comprising: placing a permanent high-pull-force magnet that generates a magnetic field sufficient to repel an elasmobranch into the environment of the elasmobranch wherein the high-pull-force magnet comprises the following properties:
   (i) a pull force of greater than about 50 pounds;
   (ii) a nominal strength of greater than about 5000 gauss alone or in combination with one or more other magnets;
   (iii) a greater than about 5 gauss of magnetic strength at a distance of about 0.01 m to about 1.0 m; and
wherein said permanent high-pull-force magnet is attached to a human body or to clothing or an accessory associated with a human body.

2. The method of claim 1, wherein the permanent high-pull-force magnet is attached to a bracelet attached to a human ankle or wrist.

3. The method of claim 1, wherein the permanent high-pull-force magnet is attached to a swim suit.

4. The method of claim 1, wherein the permanent high-pull-force magnet is attached to dive equipment, a weight belt for diving, or flippers for diving and snorkeling.

5. The method of claim 1, wherein the high-pull-force magnet is coated to prevent corrosion when the magnet is placed in water.

6. The method of claim 1, wherein the high-pull-force magnet is a neodymium-iron-boride magnet.

7. The method of claim 6, wherein the neodymium-iron-boride magnet is coated with nickel.

8. The method of claim 1, wherein the high-pull-force magnet has a shape of a cylinder, a cone, a circle, a cube, a disk, a bar, a sphere, a plate, a rod, a ring, a tube, a stick, a block, or a tapered cone.

9. The method of claim 1, wherein the high-pull-force magnet comprises a hollow portion.

10. The method of claim 1, wherein a plurality of high-pull-force magnets are arranged together in a ring.

11. The method of claim 1, wherein the high-pull-force magnet is capable of spinning.

12. The method of claim 1, wherein the high-pull-force magnet has a pull force of greater than about 100 pounds.

13. The method of claim 1, wherein the high-pull-force magnet has a pull force of greater than about 200 pounds.

14. The method of claim 1, wherein the high-pull-force magnet has a nominal strength of greater than about 10,000 gauss alone or in combination with one or more other magnets.

15. The method of claim 1, wherein the high-pull-force magnet has a nominal strength of greater than about 20,000 gauss alone or in combination with one or more other magnets.

16. The method of claim 1, wherein the high-pull-force magnet has up to about 14,000 gauss of magnetic strength at a distance of about 0.01 m to about 0.5 m.

17. The method of claim 1, wherein the high-pull-force magnet has up to about 320 gauss of magnetic strength at a distance of about 0.1 m to about 0.4 m.

18. The method of claim 1, wherein the high pull force magnet is placed in close proximity to an elasmobranch.

* * * * *